(12) United States Patent
Nozawa et al.

(10) Patent No.: US 6,367,324 B1
(45) Date of Patent: *Apr. 9, 2002

(54) DETECTING DEVICE

(75) Inventors: Ryouei Nozawa; Akira Sugiyama, both of Kanagawa (JP)

(73) Assignee: Fuji Photo Film Co., Ltd., Kanagawa (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/540,884

(22) Filed: Mar. 31, 2000

(30) Foreign Application Priority Data

Mar. 31, 1999 (JP) .......................................... 11-093751

(51) Int. Cl.⁷ ............................................... G01F 23/00

(52) U.S. Cl. ................................... 73/290 V; 367/140

(58) Field of Search ...................... 73/290 V; 367/149, 367/140, 108

(56) References Cited

U.S. PATENT DOCUMENTS

| 4,928,525 A | * | 5/1990 | Aderholt et al. .......... 73/290 V |
| 4,964,090 A | * | 10/1990 | McCarthy ................. 73/290 V |
| 5,408,168 A | * | 4/1995 | Pfandler ..................... 318/642 |
| 5,410,518 A | * | 4/1995 | Birkett ........................ 367/87 |
| 5,631,633 A | * | 5/1997 | Dreyer et al. ................ 340/621 |
| 5,755,136 A | * | 5/1998 | Getman et al. ........... 73/290 V |

\* cited by examiner

Primary Examiner—Hezron Williams
Assistant Examiner—Michael Cygan
(74) Attorney, Agent, or Firm—Sughrue Mion, PLLC

(57) ABSTRACT

A detecting device of the present invention includes a U-shaped case, a horn disposed in a leg portion of the case and outputting sound waves, a receiver disposed in a leg portion and converting sound waves received from the horn to electric signals having a voltage corresponding to a sound volume of the sound waves, and a comparator which outputs detection signals when voltages of the electric signal from the receiver equal to or are more than a threshold. By outputting the detection signal when the sound waves going out from the leg portion and entering into the leg portion pass through only the liquid, it is judged whether a liquid surface of the liquid stored in a reservoir tank equals to or is higher than a predetermined value.

14 Claims, 4 Drawing Sheets

F I G. 1
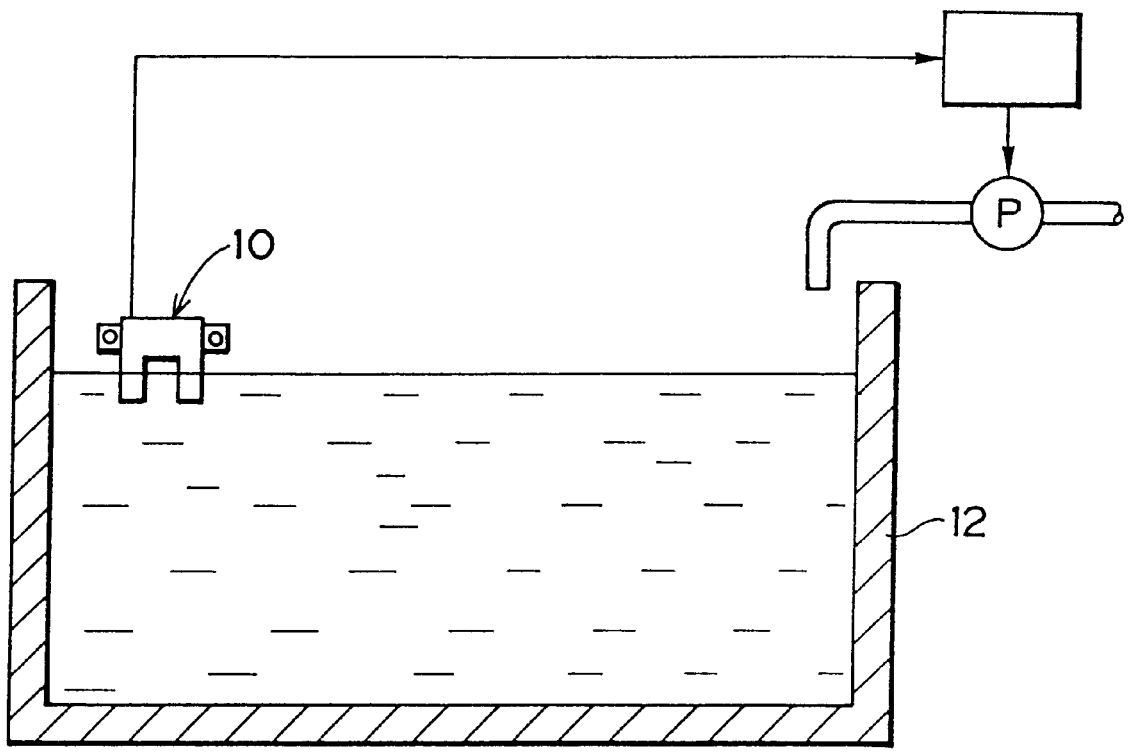

F I G. 3
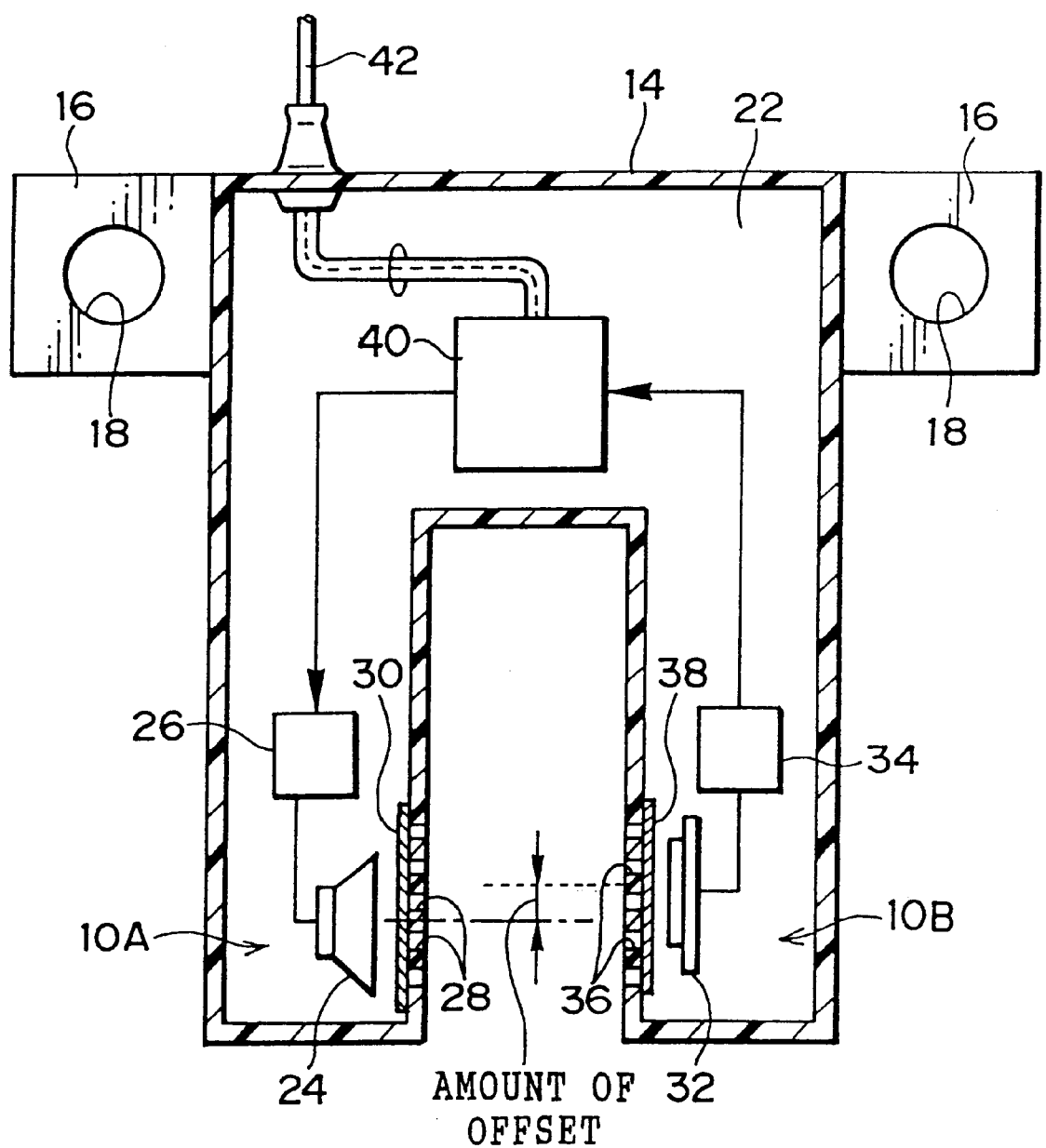

DETECTING DEVICE

BACKGROUND OF THE INVENTION

1. Field of the Invention

The present invention relates to a device for detecting whether a liquid surface of a liquid stored in a reservoir tank is a predetermined height or more.

2. Description of the Related Art

An automatic processor for photographic light-sensitive materials comprises a plurality of processing tanks such as a developing tank, a fixing tank, a rinsing tank, a replenisher tank and the like and each of the processing tanks contains a processing solution. If the amount of the processing solution stored in the processing tank is less than a reference point, the quality of images may deteriorate. Therefore, in such a case, a replenisher should be supplied to the processing tank. However, if the processing tank comprises no auxiliary tank for collecting an overflow and the replenisher is supplied by mistake to the tank in which stores the sufficient amount of the processing solution, the processing solution may overflow the processing tank.

In order to devoid such a situation, the processing tank is equipped with a detecting device which detects the accurate position of the liquid surface of the processing solution stored in the processing tank, and various types of detecting devices have been proposed.

One of typical detecting devices is that comprising a pair of electrodes. The pair of electrodes is disposed in the processing tank and is connected electrically to an ammeter for measuring a current value passing between the electrodes which varies depending on the position of the liquid surface.

In a method using the above detecting device, although respective polarities of the electrodes are changed at a predetermined interval so as to prevent components of the processing solution from depositing on the electrodes, calcium carbonate may adhere to the electrodes depending on water quality. This results in decrease of the conductivity of the electrodes and thereby the current value cannot be measured accurately. In order to devoid such a malfunction, it is necessary to conduct maintenance such as washing of the electrodes at a relatively short time interval.

Another of typical detecting devices is that comprising a float which floats in the processing solution. In this detecting device, an angle between the float and an arm connected to the float, or a rotation number of a sprocket which winds a tape connected to the float is measured so as to calculate the position of the liquid surface.

However, in the detecting device, when components of the processing solution deposits on the float, the float may not shift smoothly or may not shift completely. Moreover, the float may blow out. In order to solve these problems, maintenance for the float should be conducted frequently.

The other of typical detecting devices is that using ultrasonic wave. In this detecting device, time between output of the ultrasonic waves to the liquid surface and receiving the ultrasonic waves reflected by the surface is measured so as to calculate the position of the liquid surface.

However, if the liquid surface almost equals to the reference point and waves, the ultrasonic wave may be reflected by a peak of waves and the replenisher may not be supplied to the processing tank. In order to solve this problem, a mechanism for preventing surface wave is needed.

SUMMARY OF THE INVENTION

The present inventors found that a measurement of the accurate position of the liquid surface is unnecessarily so as to prevent deterioration of image quality and to prevent overflow.

It is an object of the present invention to provide a detecting device which use no movable member such as a float and can detect accurately whether the liquid surface equals to or is higher than the reference point for a long period of time without maintenance even if the detecting device is disposed in the processing solution containing chemicals such as a developer.

The present invention is a device for detecting whether a liquid surface of a liquid stored in a reservoir tank equals to or is higher than a predetermined height, comprising: a transmitter for outputting sound waves; a receiver which is spaced apart from the transmitter and which converts received sound waves to electric signals having a parameter corresponding to a sound volume of the sound waves; and a comparator for outputting detection signals which show that the liquid surface coincides with or is higher than the heights of the transmitter and the receiver when parameters of the electric signals from the receiver equal to or are more than a threshold.

According to the present invention, the transmitter outputs sound waves and the receiver receives the sound waves and converts them to electric signals having a parameter, such as a voltage and a current corresponding to sound volume of the received sound waves. The liquid can transmit sound waves more easily than the air. Therefore, the parameter of the electric signals which is obtained when the liquid surface coincide with or is higher than the height of the transmitter and the height of the receiver is larger than that when the liquid surface is lower than at least one of the height of the transmitter and the height of the receiver. When the parameters of the electric signals from the receiver equal to or are more than the threshold, the comparator outputs the detection signals which show that the liquid surface coincides with or is higher than the heights of the transmitter and the receiver. Accordingly, if the device of the present invention is fixed at a reference point in the reservoir tank, an operator or a host computer can judge whether the liquid surface equals to or is higher than the reference point by checking whether the comparator outputs the detection signals.

As described above, the detecting device of the present invention has no movable member which may break down and detects not the accurate position of the liquid surface but whether the liquid surface equals to or is more than the reference point for a long period of time. Moreover, the detecting device can accurately detect even if it is disposed in the processing solution containing chemicals such as a developer and components of the processing solution deposit on the detecting device, so long as both of a difference between the threshold and the parameters of the electric signals obtained when the sound waves outputted from and received by the device pass through only the air or through the liquid and the air and a difference between the threshold and the parameter of electric signals obtained when the sound waves outputted from and received by the device pass through only the liquid are sufficiently large. Accordingly, maintenance can be omitted. Further, the detection is not affected by waves of the liquid surface.

BRIEF DESCRIPTION OF THE DRAWINGS

FIG. 1 is a front view of a reservoir tank to which a detecting device of an embodiment of the present invention is applied.

FIG. 3 is a front view showing an internal structure of the detecting device according to the embodiment of the present embodiment.

DESCRIPTION OF THE PREFERRED EMBODIMENTS

FIG. 1 shows a reservoir tank 12 including a detecting device 10 of the present invention. The reservoir tank 12 may be a developing tank, a fixing tank, a washing tank, or a replenisher tank in an automatic processor for processing photographic light-sensitive materials. The developing tank, fixing tank, and washing tank may be formed integrally.

Figure 2:
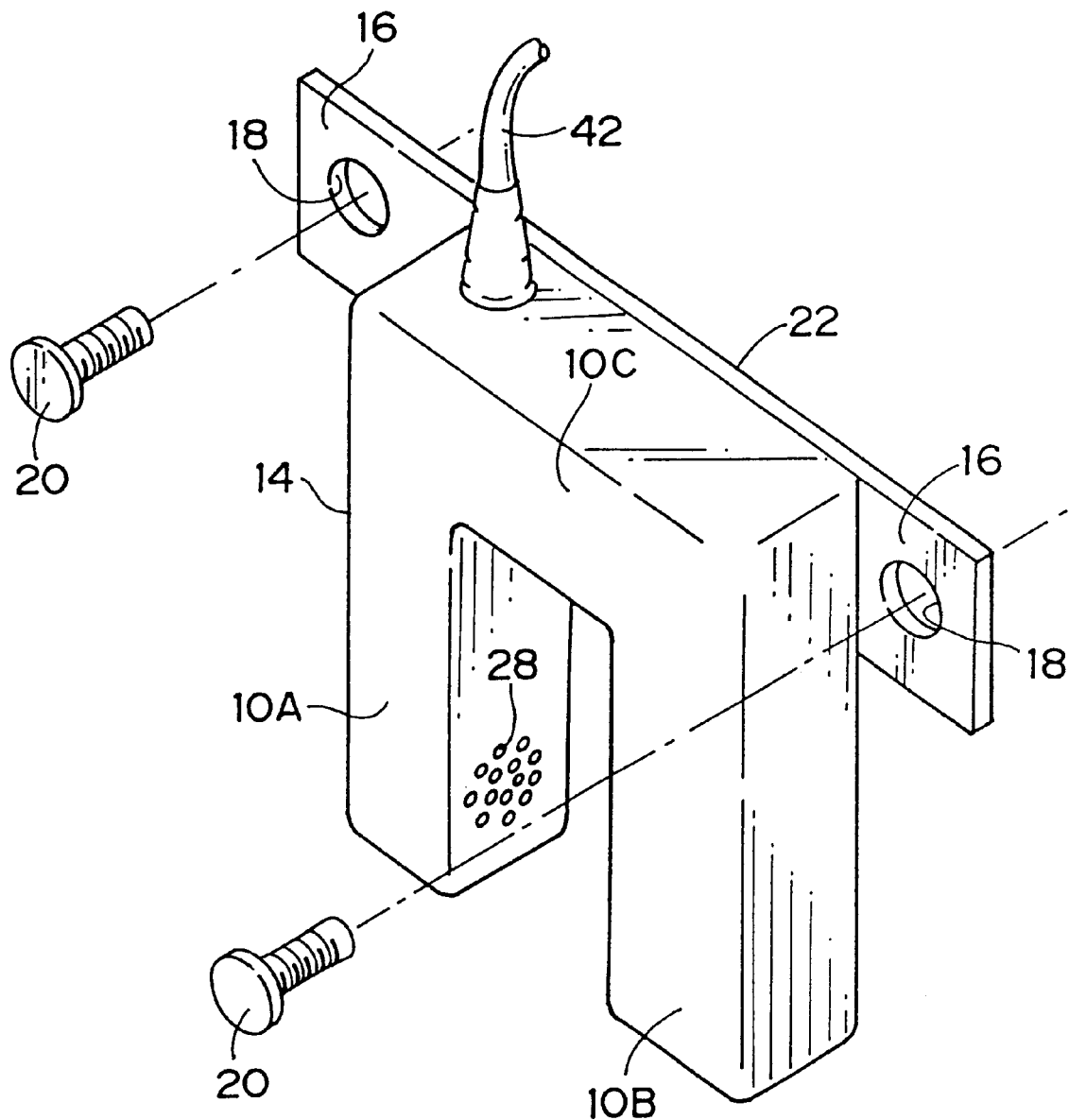
FIG. 2 is a perspective view of the detecting device according to the embodiment of the present invention.

As shown in FIG. 2, the detecting device 10 is a unit sensor and comprises a substantially U-shaped case 14 which is composed of a pair of leg portions 10A and 10B and a base portion 10C, and a base 22 which covers a rear side of the case 14. Brackets 16 are formed integrally with the base 22 in left and right directions, respectively and, when the case 14 and the base 22 are assembled, they project from the case 14. The brackets 16 include circular holes 18 through which screws 20 to be tighten in holes provided in the reservoir tank 12 pass.

As shown in FIG. 3, a horn 24 which generates sound waves including ultrasonic waves and a horn driver 26 are mounted on the base 22 so that they face the leg portion 10A. The horn 24 has a trapezoidal front shape and circular side shapes and a bigger side of the horn 24 from which sound waves are outputted is oriented to the leg portion 10B. A plurality of small holes 28 are formed in a side wall of the case 14 which faces the bigger side of the horn 24. Further, a mesh-like waterproof sheet 30 is attached to an inner side of the case 14 so as to cover the small holes 28. Therefore, sound waves pass through the small holes 28 and the liquid does not come into the case 14.

A receiver 32 for converting received sound waves to electric signals having a voltage corresponding to the sound volume, and a filter 34 for removing a noise of the signals from the receiver 32 are mounted on the base 22 so that they face the leg portion 10B. The receiver 32 is a microphone and a vibrational membrane thereof for collecting sound waves is directed to the leg portion 10A. A plurality of small holes 36 are formed in the side wall of the case 14 which faces the vibrational membrane. A mesh-like waterproof sheet 38 is attached to the inner side of the case 14 so as to cover the small holes 36. As a result, the sound waves enter the case 14 from the outside, but the liquid does not come into the case 14.

A control unit 40 is mounted on the base 22 at a position corresponding to the base portion 10C. A harness 42 including signal lines of external devices such as a power source, a host computer of an automatic processor comprising the reservoir tank 12 and a feeder for supplying a replenisher to the reservoir tank 12 when the liquid surface is less than a reference point, and the like is connected to the control unit 40, and the control unit 40 is electrically connected to the horn driver 26 and also to the filter 34.

The control unit 40 comprises a comparator which outputs detection signals to the host computer when the voltages of the electric signals from the receiver 32 equal to or are more than a threshold. The detection signals can be on signals (electrical current flow) or off signals, and in the present embodiment, they are on signals. Namely, when the voltages of the electric signals from the receiver 32 equal to or are more than the threshold, the comparator turns on electricity.

As shown in FIG. 3, a central axis of the horn 24 (indicated by the one-dot chain line in FIG. 3) and a central axis of the receiver 32 (indicated by the broken line in FIG. 3) do not coincide. In the present embodiment, an amount of offset (i.e., an interval between the one-dot chain line and the broken line in FIG. 3) is 5 mm. The offset results in a large difference between the sound volume of the sound waves received by the receiver 32, which pass through only the liquid when the liquid surface coincides with or is higher than the height of the receiver 32, and the sound volume of the received sound waves which pass through only the air or through the air and the liquid when the liquid surface is lower than the height of the receiver 32. This leads to a large difference between voltage of electric signals corresponding to the received sound waves which pass through only the liquid and voltages of electric signals corresponding to the received sound waves which pass through only the air or through the air and the liquid.

The threshold is set to a value between the voltage of the electric signals corresponding to the received sound waves which pass through only the liquid and the voltages of the electric signals corresponding to the received sound waves which pass through only the air or through the air and the liquid.

Further, a distance between the leg portion 10A and the leg portion 10B is 5 mm or more, and therefore, rising of the liquid surface between the leg portions 10A and 10B due to a surface tension is prevented.

The detecting device 10 is fixed in the reservoir tank 12 so that the leg portions 10A and 10B are directed downwardly and so that the receiver 32 is located at a reference point for the liquid surface. In order to prevent the liquid entering into a hole, which is provided in an upper surface of the case 14, for passing the harness 42, the case 14 preferably has so large size that the upper surface is higher than the maximum height of the liquid surface which is the height just after the replenisher have been supplied to the reservoir tank 12. Alternatively, the hole of the upper surface may be sealed.

The reference point is determined by dividing the minimum amount of the liquid which is needed to obtain good image quality by the bottom surface size of the reservoir tank 12.

Next, operation of the present embodiment will be described.

The horn 24 provided in the leg portion 10A of the detecting device 10 outputs sound waves to the receiver 32 provided in the leg portion 10B. When the liquid is first supplied to the reservoir tank 12 containing no liquid, the sound waves going out from the leg portion 10A and entering into the leg portion 10B pass through the air. The sound waves pass through the liquid more easily than through the air. Therefore, the sound volume of the sound waves received by the receiver 32 at this time is small and the receiver 32 converts them to electric signals having a low voltage including zero volt. The comparator compares the voltages of the electric signals from which a noise is removed by the filter 34 and a threshold, and as a result, does not output detection signals and informs the host computer that the position of the liquid surface in the reservoir tank 12 is less than the reference point. Therefore, the supply of the replenisher is continued.

When the liquid surface reaches the height of the receiver 32, the sound waves going out from the leg portion 10A and entering into the leg portion 10B pass through only the liquid. Therefore, the sound volume of the sound waves received by the receiver 32 at this time is large and the receiver 32 converts them to electric signals having a high voltage more than the threshold. The comparator compares the voltages of the electric signals from the noise is removed by the filter 34 and the threshold, and as a result, outputs detection signals and informs the host computer that the position of the liquid surface in the reservoir tank 12 equals to the reference point. The host computer causes the feeder to supply a predetermined volume of a replenisher into the reservoir tank 12; At this time, the height of the liquid surface is maximum.

As the photographic light-sensitive materials are processed, the liquid surface in the reservoir tank 12 drops. When the liquid surface is lower than the receiver 32, the comparator does not output detection signals again and the host computer makes the feeder to supply the predetermined amount of the replenisher to the reservoir tank 12. The liquid surface rises by supplying the replenisher to the reservoir tank 12 and equals to or is more than the reference point, the comparator outputs the detection signals again.

As described above, the liquid surface in the reservoir tank 12 is maintained in a specific range.

When the liquid is a processing solution such as a developer, components thereof may deposit on the leg portions 10A and 10B. Further, when there is a large quantity of deposit, the small holes 28 and 30 formed in the leg portions 10A and 10B may be closed.

As a result, a portion of the sound waves outputted from the horn 24 are cut off by the deposit, but the remain of the sound waves pass also through a wall surface. Therefore, there is no case in which the sound waves are not completely transmitted to the receiver 32. Although a voltage of the electric signal drops, there is no possibility that the sound waves be completely cut off as in an optical signal or the like. Accordingly, malfunction due to the deposit does not occur. Further, the detecting device 10 has no movable member, and therefore, no false detection caused by operational deficiency occurs.

Moreover, even if the liquid surface waves, so long as the threshold is set to a value more than voltages of electric signals obtained when sound waves pass slightly through the air, no false detection occurs.

In the present embodiment, the center line of the horn 24 serving as a transmitter and the center line of the receiver 32 does not coincide (an interval between the one-dot chain line and the broken line in FIG. 3 is an amount of offset). The offset results in a large difference between voltage of electric signals corresponding to the received sound waves which pass through only the liquid and voltages of electric signals corresponding to the received sound waves which pass through only the air or through the air and the liquid. Therefore, a signal to noise ratio (S/N ratio) is improved and detection accuracy can be improved.

Further, since the distance between the leg portions 10A and 10B is set to be 5 mm or more, there is no possibility that the liquid between the leg portions 10A and 10B rise due to the surface tension, which leads to an error.

Figure 4:
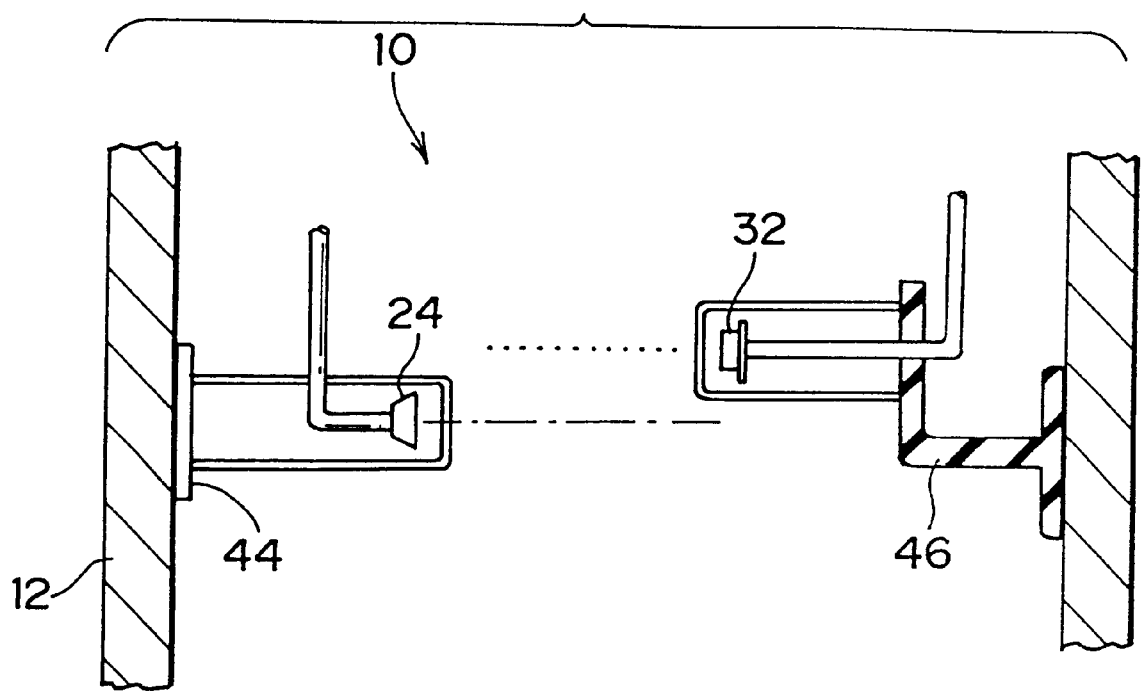
FIG. 4 is a front view of a detecting device according to another embodiment.

In the present embodiment, the detecting device 10 is a unit sensor, but as illustrated in FIG. 4, the horn 24 and the receiver 32 can be accommodated in separate cases and are mounted respectively at predetermined positions in the reservoir tank 12 via brackets 44 and 46. In this case, the bracket 46 of the receiver 32 is preferably made of a material which prevents propagation of vibration (for example, rubber) so as to prevent the sound waves outputted from the horn 24 and transmitted through the reservoir tank 12 to be received by the receiver 32.

In the present invention, a piezoelectric element can be used as the receiver 32.

What is claimed is:

1. A device for detecting whether a liquid surface of a liquid stored in a reservoir tank equals to or is higher than a predetermined height, comprising:

a transmitter for outputting sound waves;

a receiver which is spaced apart form said transmitter and which converts received sound waves to electric signals having a parameter corresponding to a sound volume of the sound waves;

a comparator for outputting detection signals which show that the liquid surface coincides with or is higher than the heights of said transmitter and said receiver when parameters of the electric signals form said receiver equal to or are more than a threshold; and a first case in which said transmitter is accommodated, wherein a plurality of holes are formed in said first case and are covered by a waterproof sheet attached to an inner side of the case.

2. A device according to claim 1, wherein the parameter is any of a voltage and a current.

3. A device according to claim 1, wherein the detection signals are on signals through which electric current flows.

4. A device according to claim 1, further comprising a second case in which said receiver is accommodated.

5. A device according to claim 4, wherein a plurality of holes are formed in said second case, and are covered by a waterproof sheet attached to an inner side of said second case, and wherein said plurality of holes are provided on each of walls of said first and second cases which face each other.

6. A device according to claim 4, wherein said cases are formed integrally.

7. A device according to claim 6, wherein said cases has a substantially U-shaped configuration when seen from the front, and has two leg portions and a base portion, and said transmitter is disposed in one of the leg portions and said receiver is disposed in the other and said comparator is disposed in the base portion.

8. A device according to claim 7, wherein a plurality of holes are formed in each of walls, which face to each other, of the leg portions and are covered by a waterproof sheet attached to each of inner sides of the leg portions.

9. A device according to claim 7, wherein an interval between respective inner walls of the leg portions is set so as not to cause rising of a liquid surface due to surface tension.

10. A device according to claim 1, further comprising a filter for removing noise from the electric signals outputted from said receiver.

11. A device according to claim 6, wherein a bracket for fixing the device to the reservoir tank is integrated with the case.

12. A device according to claim 1, wherein said transmitter is a horn.

13. A device according to claim 12, wherein the horn is directed to said receiver.

14. A device according to claim 1, wherein said receiver is any of a microphone and a piezoelectric element.

* * * * *